United States Patent
Piccini

[19]

[11] Patent Number: 6,042,322
[45] Date of Patent: Mar. 28, 2000

[54] MACHINE FOR HANDLING OBJECTS AND A PALLET THAT IS ESPECIALLY SUITABLE FOR USE IN THE SAID MACHINE

[76] Inventor: Giancarlo Piccini, Via del Laghetto 12/2, I-16033, Lavagna, Province of Genoa, Italy

[21] Appl. No.: 09/148,493

[22] Filed: Sep. 4, 1998

[30] Foreign Application Priority Data

Sep. 5, 1997 [IT] Italy .................................. GE97A0072

[51] Int. Cl.[7] .................................................. B65G 1/04
[52] U.S. Cl. ........................................... 414/281; 414/282
[58] Field of Search ..................................... 414/286, 282, 414/667, 281, 631, 671, 664, 663, 668, 662

[56] References Cited

U.S. PATENT DOCUMENTS

| | | | |
|---|---|---|---|
| 3,549,025 | 12/1970 | Messner | 414/282 |
| 3,840,131 | 10/1974 | Castaldi | 414/281 |
| 4,735,539 | 4/1988 | Hakkinen et al. | 414/282 |
| 4,995,774 | 2/1991 | Nusbaum | 414/282 |
| 5,032,053 | 7/1991 | Krieg | 414/282 |
| 5,397,211 | 3/1995 | Lloyd et al. | 414/282 |
| 5,507,613 | 4/1996 | Tokiwa | 414/282 |
| 5,540,532 | 7/1996 | Carder et al. | 414/282 |
| 5,630,692 | 5/1997 | Hanaya | 414/286 |
| 5,655,870 | 8/1997 | Yasuhara et al. | 414/282 |

*Primary Examiner*—Robert P. Olszewski
*Assistant Examiner*—Isobel A. Parker
*Attorney, Agent, or Firm*—Larson & Taylor

[57] ABSTRACT

Machine for handling objects such as raw materials, semi-finished products, finished parts, and in particular metal sheets or the like, comprising: a portal comprising two uprights and a transverse beam and mounted on a movable carriage with drive means, a crossmember that can move up and down the said uprights and is connected to the latter as well as to lifting means; and two tracks, mounted at right angles to the said crossmember, in which two prongs with drive means can travel back and forth; the said means of lifting the said movable crossmember comprise two screws arranged parallel to each of the said uprights, each screw being engaged in a nut arranged at one end of and with its axis perpendicular to the said crossmember, and each screw being provided with drive means, and also a pallet that is especially suitable for use in the said machine.

7 Claims, 7 Drawing Sheets

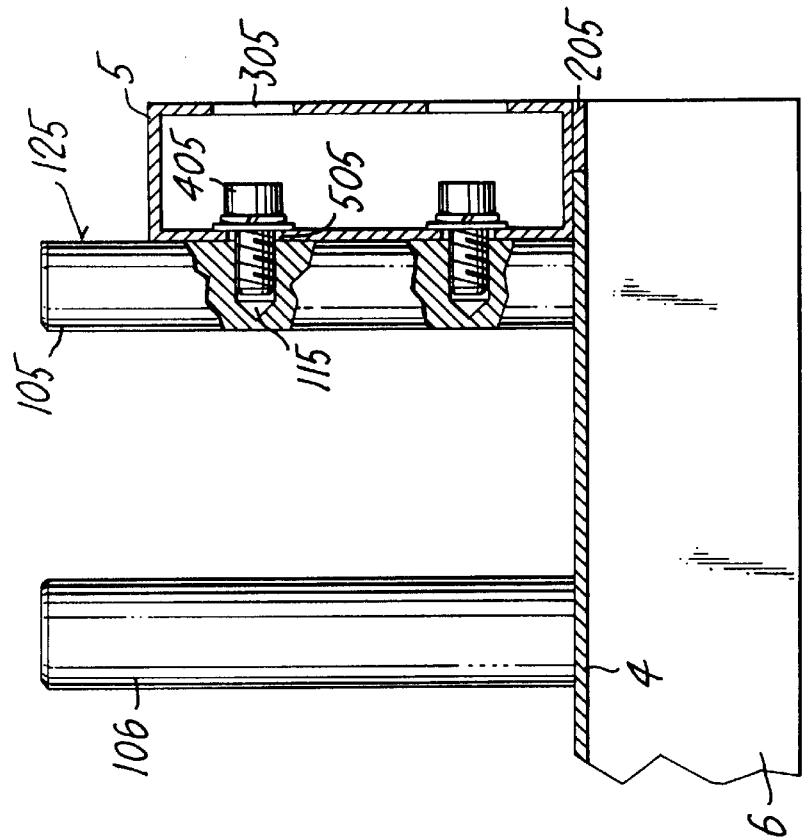
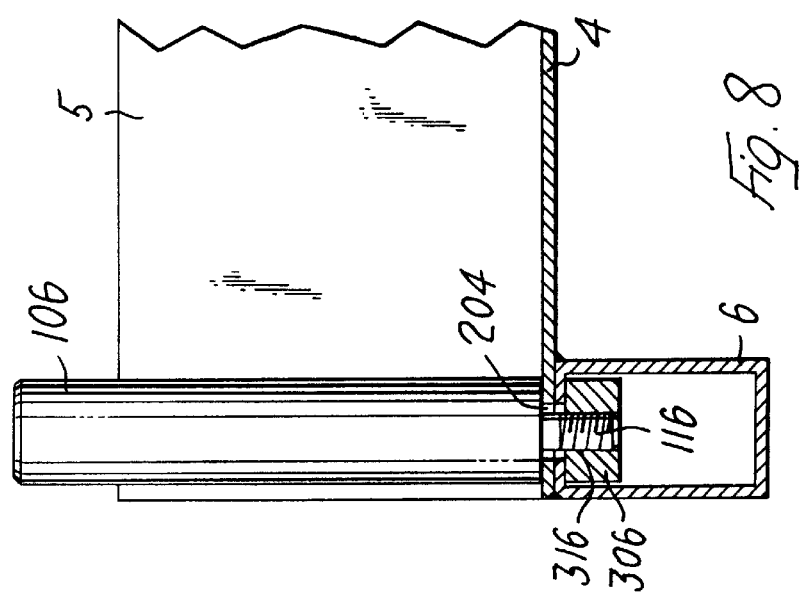

MACHINE FOR HANDLING OBJECTS AND A PALLET THAT IS ESPECIALLY SUITABLE FOR USE IN THE SAID MACHINE

TECHNICAL FIELD OF THE INVENTION

This invention relates to a machine for handling objects such as raw materials, semifinished products, finished parts, and in particular metal sheets or the like, as well as a pallet that is especially suitable for use in the said machine.

BACKGROUND OF THE INVENTION

The prior art includes numerous systems for storing and handling different kinds of objects that include both the storage structure and the machine or machines for handling said objects, such systems usually being organized in an integrated way, that is to say such that the machines are designed expressly to interact with a given structure.

These systems are highly efficient, but at the same time the costs of their installation are often out of the reach of small or medium-sized enterprises operating for example in the field of sheet metal working. The reason for this is that these installations are generally of large dimensions and difficult to adapt to confined productive areas. In particular, the machines used in these storage systems are usually conveyor/elevator systems comprising a portal that translates a forklift or suchlike system having lifting means of varying design. In these machines it is usually difficult to reconcile precision control of the lifting means with a low cost for the equipment used.

In addition to this, the forks that are used in such machines are often of telescopic type, so as to permit improved accessibility to the storage structure; but forks of this type have the disadvantage that they cannot carry very heavy loads, and besides this they are complex and therefore expensive to build.

With these kinds of machine there is common and extensive use, in the management of industrial and/or commercial stores, of so-called pallets for the transport and storage of goods. Pallets are basically rectangular loading boards, normally made of wooden planking with two or more stiffening crossmembers arranged at right angles to the axes of the said planking. The pallets in question are highly versatile, but disadvantages arise when used with certain particular materials.

In particular, for transporting and storing thin, flat objects of relatively large size and of a thickness such as not to make the stack of objects to be transported self-supporting, such as metal sheets, the use of a pallet of known type is unsatisfactory.

In the first place, the total depth of the pallet plus its load raises problems for ergonomic management of the store; in the second place, the stack of metal sheets is unstable on the pallet, and is positioned on it at random, which makes repositioning necessary when the said stack of sheet metal is intended to be used for automatic processing.

SUMMARY OF THE INVENTION

The object of this invention is therefore a machine for handling objects such as raw materials, semifinished products, finished parts, and in particular metal sheets or the like which, when fitted into a storage structure that is easily obtainable on the market and is organized in an extremely simple way, enables the operations of loading and unloading the said objects to be performed swiftly and with precision.

A further object of this invention is to provide a pallet that best suits the needs of such a machine, and in particular makes it easier to manage thin, flat objects and the like.

The subject of this invention is therefore a machine for handling objects such as raw materials, semifinished products, finished parts, and in particular metal sheets or the like, comprising: a portal comprising two uprights and a transverse beam and mounted on a movable carriage with drive means, a crossmember that can move up and down the said uprights and is connected to the latter as well as to lifting means; and two tracks, mounted at right angles to the said crossmember, in which two prongs with drive means can travel back and forth, the said means of lifting the said movable crossmember comprise two screws arranged parallel to each of the said uprights, each screw being engaged in a nut arranged at one end of and with its axis perpendicular to the said crossmember, and each screw being provided with drive means.

In one embodiment, the crossmember carrying the tracks for the prongs is provided with support elements that can move in a direction parallel to the uprights of the said portal and in both directions, in order to reposition the load on the said prongs.

Another subject of this invention is a pallet that is especially suitable for use in the said machine, for the conveyance and storage of thin, flat objects such as, for example, metal sheets, the said pallet comprises a loading plate having substantially rectangular shape, this plate being provided along its two long sides with two walls connected to the upper face of the said supporting plate along its peripheral edges, while two crossmembers arranged at right angles to the said walls are connected to the opposite face of the said plate and essentially along the peripheral edge of the said plate.

In one embodiment of the invention, the said loading plate is made of sheet metal, from at least one sheet thereof; the said sheet preferably has a plurality of through holes arranged in a plurality of rows which are parallel with each other and parallel with the said crossmembers.

The pallet according to the invention may advantageously be provided with load centering means, so as to enable optimal positioning.

BRIEF DESCRIPTION OF THE DRAWINGS

Other advantages and features of the machine according to the present invention will be evident from the following detailed description of certain forms thereof. The invention, which is given by way of example, with no limitation being implied, refers to the accompanying drawings in which:

FIG. 8 illustrates a detail with parts in section of the pallet according to the present invention; and FIG. 9 illustrates a detail with parts in section of the pallet according to the present invention.

DESCRIPTION OF SOME PREFERRED EMBODIMENTS OF THE INVENTION

Figure 1:
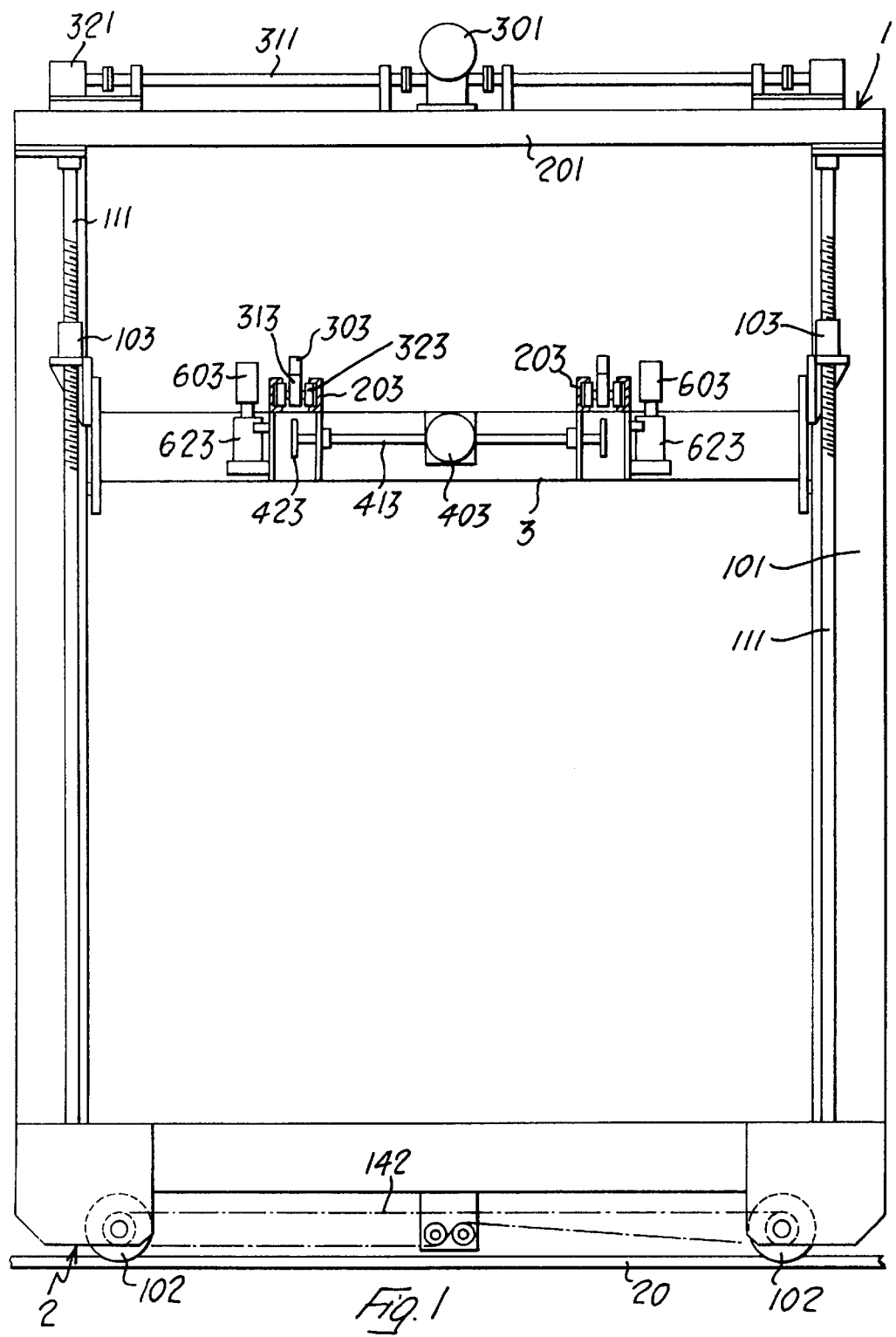
FIG. 1 is an elevation of the machine according to the present invention.

FIG. 1 illustrates the machine according to the present invention; the numeral 1 denotes the portal of the said machine, comprising the two longitudinal uprights 101 each connected at one end to the transverse beam 201. The other ends of the uprights 101 are connected to the carriage 2, which has wheels 102 for travelling on the rails 20. Connected movably to the two uprights 101 is a crossmember 3 that can move up and down the said uprights 101 by means of the couplings between two nuts 103 attached to the ends of the said crossmember 3, with their axes perpendicular to the latter, and two screws 111 set parallel to the said uprights 101 and connected, on the beam 201, to drive means, the motor/gearbox assembly 301, through the shafts 311 and the couplings 321. On the crossmember 3 are two tracks 203 containing two movable prongs 303 set on runners 313 which run in the tracks 203 on wheels 323, the said runners being moved by the pulleys 423 connected to the motor/gearbox assembly 403 via the transmission shafts 413. Alongside each track 203, on the side nearest the upright 101, is a mobile support element 603 mounted on hydraulic jacks: the latter are illustrated more clearly in FIGS. 2 and 4, described below; of these jacks, jack 623 is bracketed to the side of the said track 203.

Figure 2:
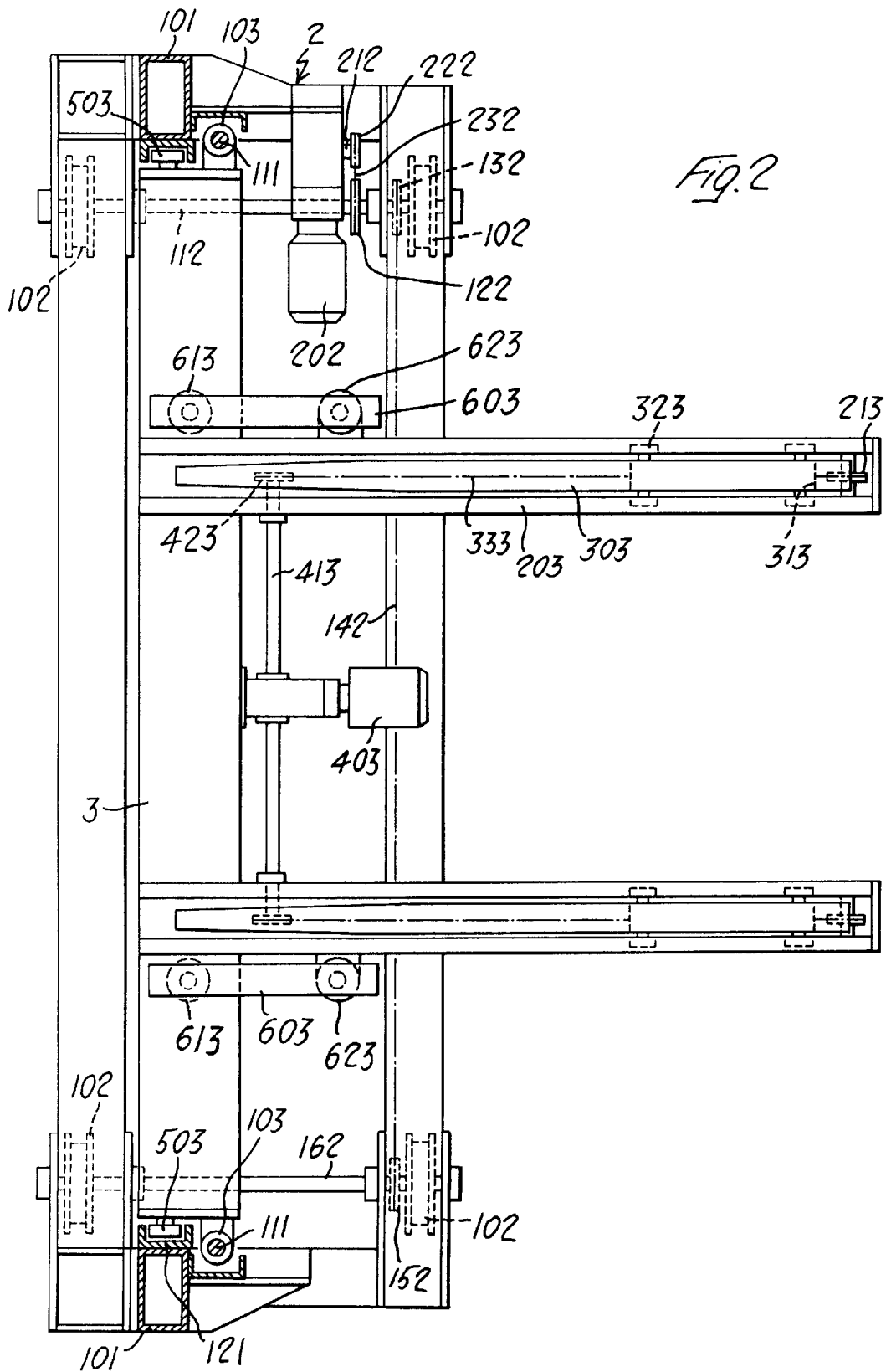
FIG. 2 is a plan view, with parts in section, of the machine illustrated in FIG. 1.

In FIG. 2 the machine of the invention is illustrated in plan view with parts in section. The carriage 2 basically consists of a rectangular metal frame at the ends of which the axles 112 and 162 of the wheels 102 are mounted parallel to the tracks 203 of the prongs 303. At the end of the carriage 2 containing axle 112 is the motor/gearbox assembly 202 connected to the said axle by the hub 212 to which the pulley 222 is keyed; a pulley 122 keyed to the axle 112 is connected to the latter pulley by the belt, or chain, 232. Near one of the wheels 102 is a pulley 132 which passes the drive to the pulley 152 keyed to axle 162, via the belt or chain transmission 142.

The movable crossmember 3, already illustrated and described, is provided at its ends with the wheels 503 which run in the C-section tracks 121 positioned on the sides of the uprights 101 that face towards the centre of the portal 1. The prongs 303 and their respective tracks 203 are clearly shown in the figure. The runner 313 of each prong 303 is moved by the belt or chain transmission 333 which connects it, via the return pulley 213, to the pulley 423 keyed to each of the output shafts 413 of the motor/gearbox assembly 403. The figure shows the mobile support elements 603 mounted on the jacks 613 positioned inside the crossmember and 623 bracketed alongside the said tracks 203.

Figure 3:
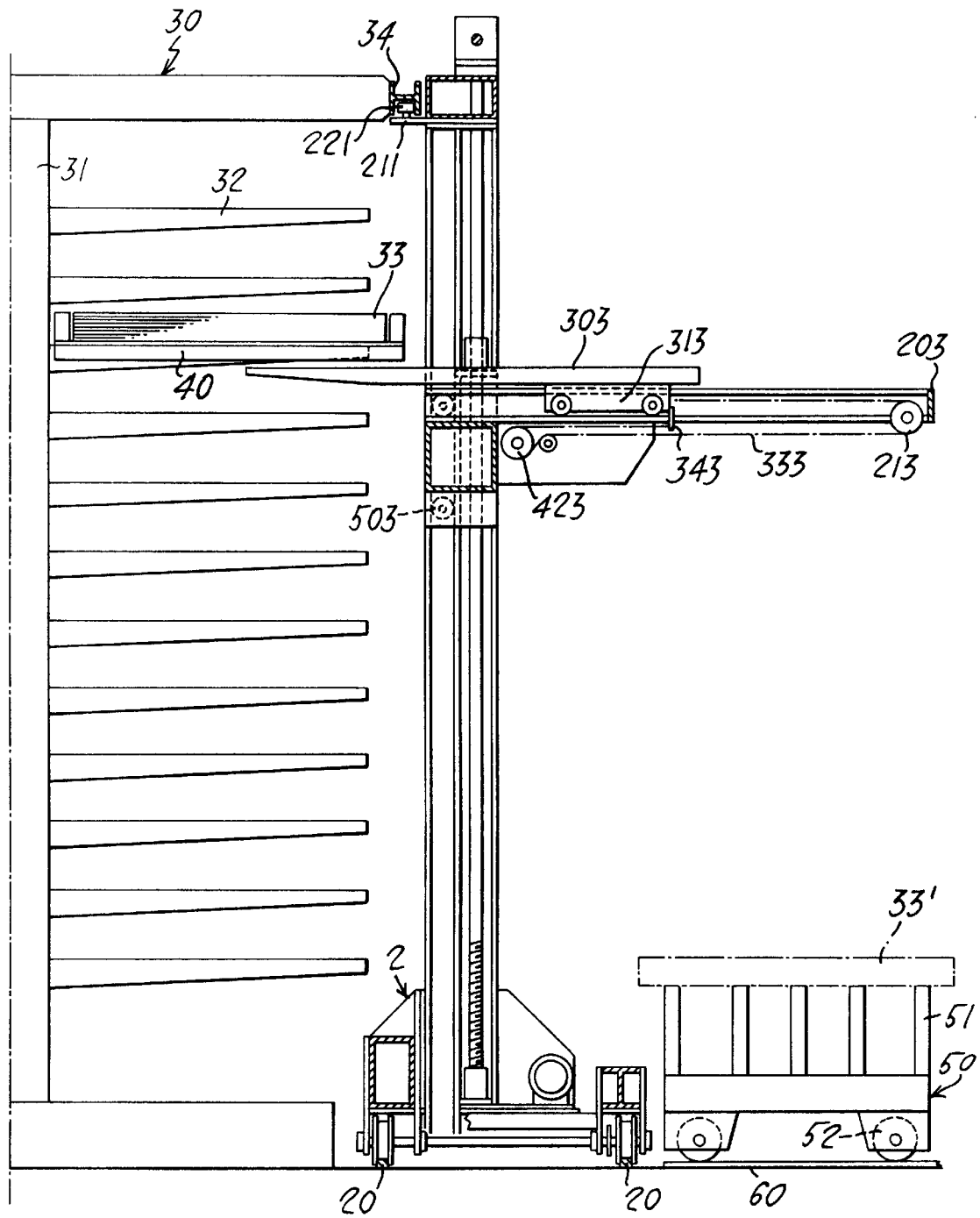
FIG. 3 is a side elevation, with parts in section, of the machine according to the invention standing next to a storage structure for thin, flat objects.

FIG. 3 shows the machine according to the invention standing next to a structure 30 for storing stacks of thin, flat objects; in the figure, identical parts are given the same numbers. This structure consists of a metal frame 31 fitted with shelves 32 on which the pallets 40 carrying the stacks of sheet metal 33 are placed. At the top, the frame 31 supports an H-section track 34 for the wheel 221 which is connected to the cantilever portion 211 of the beam 201 of the portal 1 of the machine according to the invention. In the figure, illustrated alongside the carriage 2 of the machine is the transfer carriage 50 on which the stack of sheet metal 33' is positioned, as illustrated in chain lines; the transfer carriage 50 possesses the bars 51 and the wheels 52 that travel along the rails 60. In the machine according to the invention the transmission of motion to the prongs 303 of the movable crossmember 3 is more clearly visible. As illustrated, the transmission 333 is connected at one end to one end of the runner 313, while its other end is connected to a portion 343 fixed to and projecting from this end of the runner 313.

Figure 4:
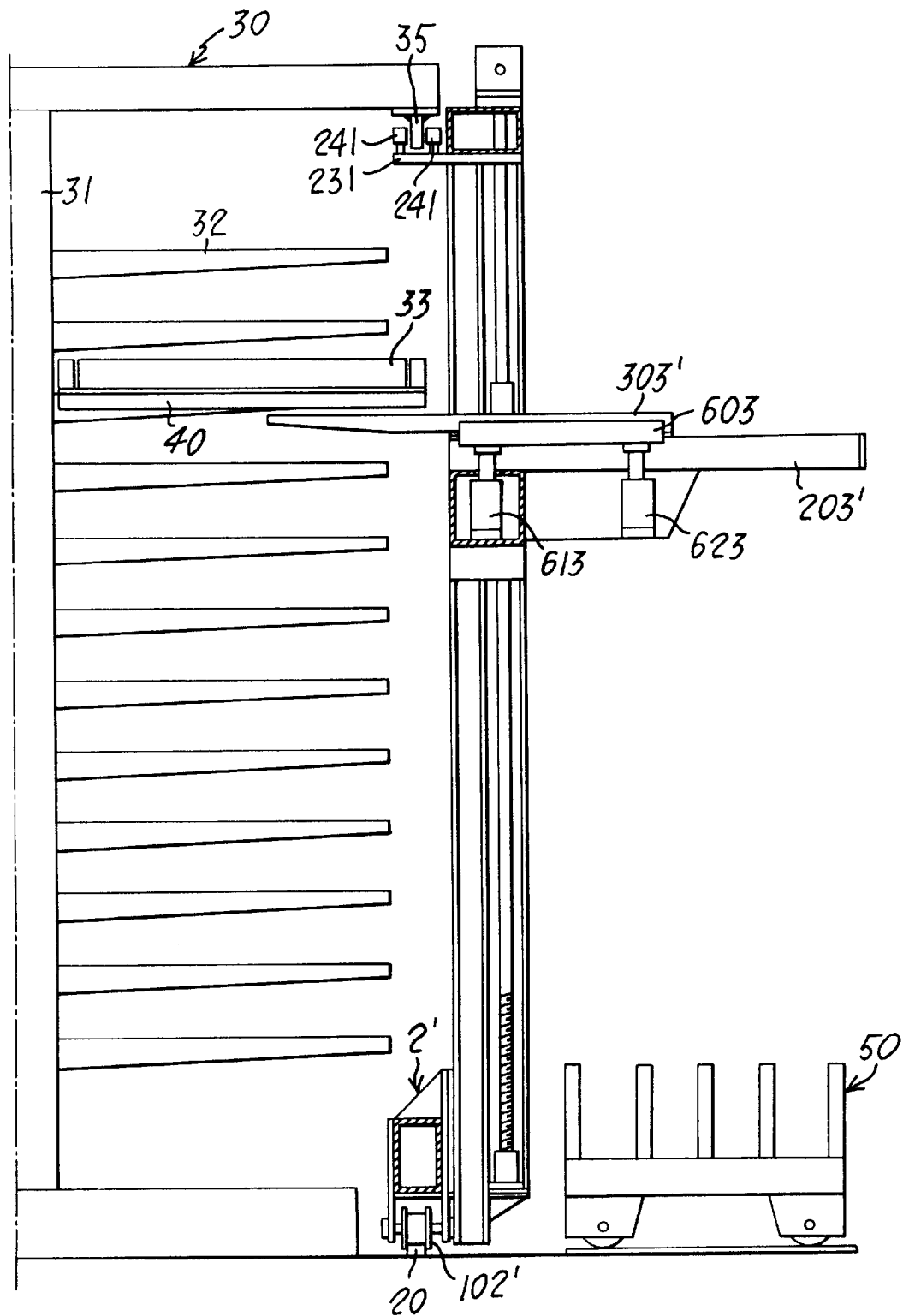
FIG. 4 is a side elevation, with parts in section, of an alternative embodiment of the machine according to the invention standing next to a storage structure for thin, flat objects.

FIG. 4 meanwhile shows an alternative embodiment of the machine according to the present invention; identical parts are given the same numbers. In this alternative embodiment the carriage 2' on which the portal 1 is mounted has only one wheel for each of its axles, and its width is approximately half that of the carriage 2 described earlier. The prongs 303', and consequently the tracks 203', are also shorter than in the other embodiment, and the result is that the machine takes up much less space. The figure also illustrates the positioning of the jack 613 of the mobile support element 603 inside the crossmember 3. The beam 201 of the portal is linked to the framework 30 by a pair of rollers 241 on the cantilever portion 231 attached to the said beam 201, and these rollers engage about a T-section track fixed towards the upper extremity of the said framework 30.

The manner in which the machine according to the present invention operates will be made clear in the following account. In FIG. 3 the machine is shown in operation, in the act of removing a pallet from the storage structure 30. As described earlier, the carriage 2 of the machine is driven along the rails 20 by the motor/gearbox assembly 202, and the portal 1 is connected to the H-section track 34 of the structure 30 via the wheel 221 of the beam 201. When a given load, which may be a stack of sheet metal or a pallet for transporting the same, such as the pallet 40 shown in FIG. 3, is to be removed, the movable crossmember is raised by the action of the screws 111 and nuts 103 driven by the motor/gearbox assembly 301; the prongs 303 are then advanced into position underneath the load.

Next, the prongs 303 are retracted along the tracks 203; the load, in this case the pallet 40, must then be made ready to be positioned on the transfer and conveyor carriage 50. To carry out this operation, however, consideration must be given to the possibility of complete excursion of the prongs 303 in the tracks 203, for, as is evident, this transfer cannot be performed in one movement. For this purpose the two mobile support elements 603 are raised by their respective pairs of hydraulic jacks 613, 623 until the load is separated from the prongs 303. The prongs 303 can now be moved forward again; then, once the load has again been laid on the prongs, the latter can position it in the most suitable manner for the operations of unloading.

The carriage 50 has bars 51 which, by means of holes formed on the loading plate of the pallet 40, enable the stack 33' of sheets to be separated from the said pallet.

A closely similar process will be followed when the pallets or stacks of sheet metal are to be positioned on the structure 30 for storage.

The operation of the machine according to the invention may be controlled manually through its various stages, or else it may more conveniently be integrated into an automated store management system supplying stock to the machines for processing.

Advantageously, as illustrated in FIG. 4, the machine can be constructed with a much smaller carriage, and hence be more suited to working areas of modest dimensions, in which case it will of course be necessary to provide a more efficient attachment between the portal beam 201 and the framework 30.

Constructed in this way, the machine is capable of handling objects such as raw materials, semifinished products, finished parts, and in particular metal sheets or the like with the greatest efficiency and with vastly reduced infrastructural requirements, thus making possible a notable decrease in running costs, a crucial issue in the real world of small-scale production.

Figure 5:
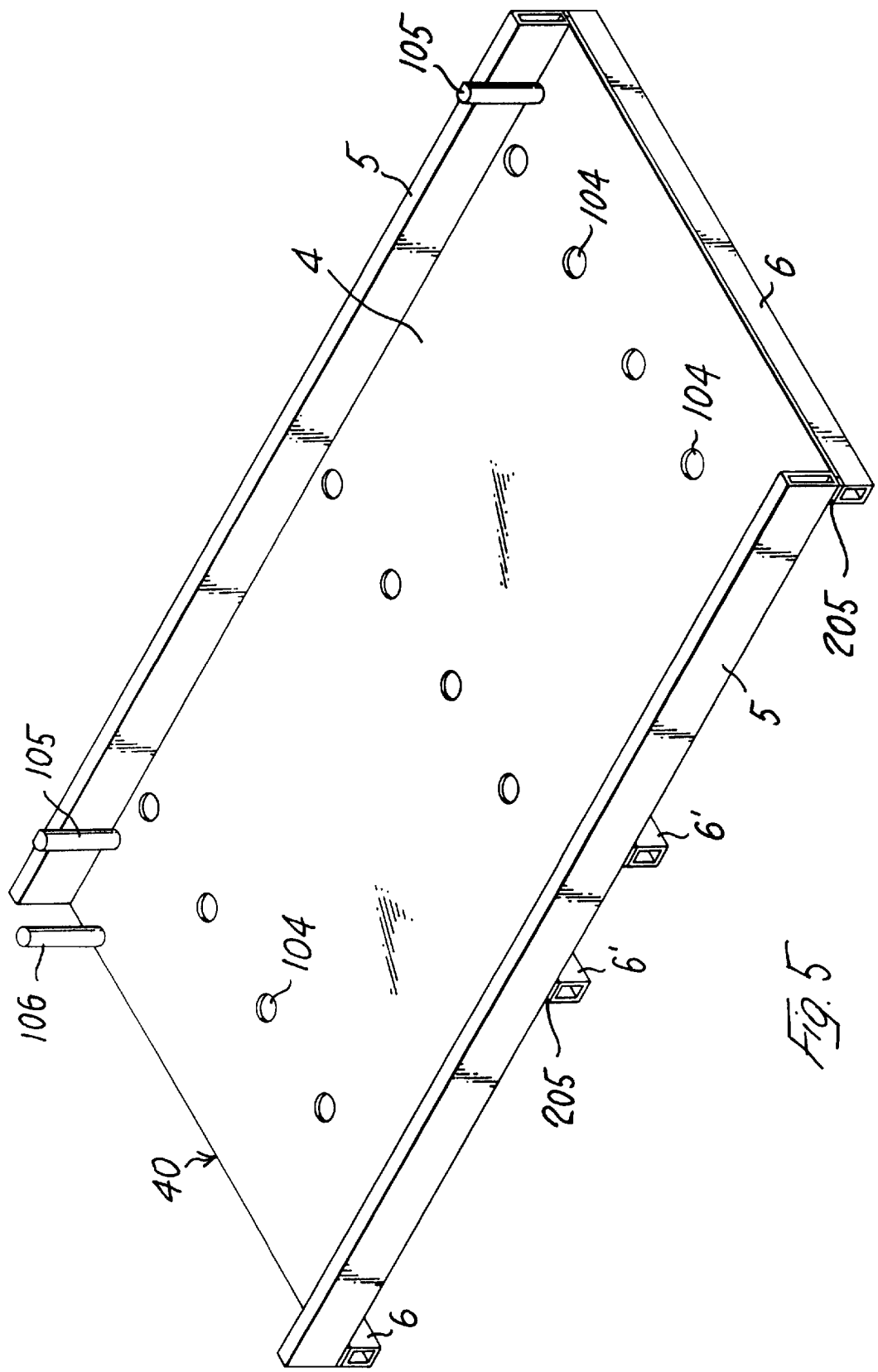
FIG. 5 is a perspective view of a pallet according to the present invention.

FIGS. 3 and 4 depict a special type of pallet according to the present invention. In FIG. 5 this pallet 40 is illustrated in greater detail; 4 denotes the loading plate which is made of sheet metal, preferably steel, and approximately rectangular in shape. Along the long sides of the peripheral edge of the said plate 4 run two walls 5, in this case two lengths of rectangular tubular section joined to one of its faces, e.g. by welding. On the opposite face of the said plate 4 there are also crossmembers 6, once again rectangular tubular sections, at right angles to the said walls 5 and positioned along the short sides of the said plate 4; between the crossmembers 6 and joined to the same face of the plate 4 are the intermediate crossmembers 6' which run parallel to the crossmembers 6. A number of series of through holes 104 are formed in the plate in parallel lines perpendicular to the said walls 5. Against the side face of one of the walls 5 and joined to it, in the manner described later, are two centring pins 105, positioned towards either end of the said wall 5. Inserts 205 are inserted in the intersections between crossmembers 6 and walls 5.

Figure 6:
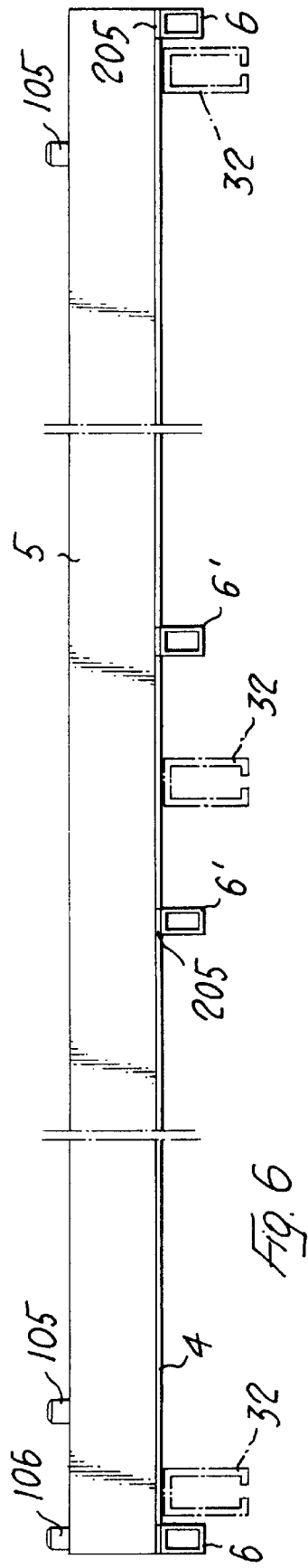
FIG. 6 is a front elevation of the pallet illustrated in FIG. 5.
Figure 7:
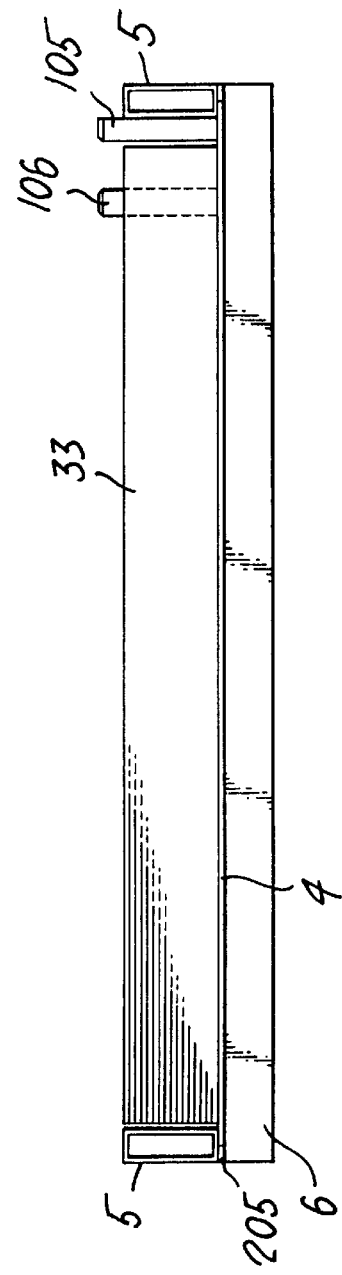
FIG. 7 is a side elevation of the pallet illustrated in FIG. 5, with a full load.

FIG. 6 illustrates the pallet of FIG. 5 in front elevation; identical parts carry the same numbers; chain lines show the brackets 32 that carry the pallet in a storage framework 30, such as that illustrated in FIGS. 3 and 4. In FIG. 7 it can be seen that, for a given load of thin, flat material, such as for example the stack 33 of metal sheets, the whole load is located inside the space bounded by the two walls 5.

FIG. 8 illustrates the connection between the centring pin 106 and the pallet. In practice, the pin 106 has at one end a threaded tail 116 which fits into a hole 204 in the plate 4 located over the crossmember 6; inside the crossmember 6 is the block 306 in which is a threaded hole 316 into which the tail 116 is screwed.

Lastly, FIG. 9 shows the connection of one of the centring pins 105 to the wall 5. In this case it has a flat 125 on its lateral surface and this flat contains two threaded holes 115. The said holes 115 take the threaded portions of the bolts 405, which are inserted into the holes 505 in the side of the wall 5, via the apertures 305 formed in the opposite side. As can be seen in the Figure, the wall 5 is fixed to and projects from the plate 4, and an insert 205 is inserted in the intersection between the said wall 5 and the crossmember 6.

The operation of the pallet according to the present invention will be clear from the following account. As can be seen in the drawings described above, the pallet according to the invention comprises, unlike the pallets used conventionally, a very thin loading plate 4, which is usable because of the fact that the said plate exploits the structural stiffening effect of the walls 5 and of the crossmembers 6 and 6' in combination with each other. As FIG. 6 shows, the brackets 32 support the loading plate 4 directly. While it is of course obvious that the essential function of the crossmembers 6 and walls 5 is to create a sort of frame for the plate 4, the crossmembers 6' have the function of further stiffening the structure, depending on its length. Longer pallets may therefore have a greater number of intermediate crossmembers 6'.

In practice a large part of the vertical dimension of the pallet is usable for loading purposes, thus providing a considerable saving in terms of space and greater possibilities of use. Moreover, since the stacks of sheet metal are located between the two walls 5, they are necessarily arranged in a more orderly manner. Another factor in organizing the position of the load on the plate 4 is represented by the centring pins 105, 106 which enable the sheets of material to be laid in a standard position on the pallet.

The holes 104 formed in the loading plate permit the use of frames for support and transfer, as in FIG. 3, of known type, comprising a plurality of fingers that are inserted into the said holes of the plate 4, in such a way that once the pallet is laid on the said frame the stack of sheet metal is withdrawn from the pallet and made accessible, for example to conveyor machines.

I claim:

1. Machine for handling planar objects comprising:
   a portal including two parallel uprights and a transverse beam connected between said two uprights;
   a movable carriage on which said portal is mounted for horizontal movement;
   a first drive means for driving said movable carriage and said portal mounted thereto;
   a crossmember movably connected to said uprights and having respective ends;
   a lift means for moving said crossmember vertically between said uprights in said portal, said lift means including
      two screws, each of which is mounted parallel to a respective said upright,
      two nuts, each of which engages a respective said screw and each of which is provided at a respective said end of said crossmember, and
      a second drive means for driving said screws so that said nuts engaged therewith move vertically along said screws and hence said crossmember moves vertically between said uprights;
   two guide tracks mounted to said cross member, said guide tracks extending parallel and opposite to one another in a horizontal plane and at right angles away from said crossmember;
   two prongs for engaging a planar object from underneath with at least two separated points of contact for the planar object, each said prong being mounted to a respective said guide track for guided back and forth movement in the horizontal plane and at right angles to said crossmember, and each said prong having an upper portion which extends above the respective said guide track;
   a third drive means for moving said prongs back and forth along the respective said guide tracks;
   two support elements, each said support element being located alongside of a respective said guide track and providing at least two separated points of contact for the planar object; and
   two second lift means for vertically lifting and lowering respective said support elements, each said second lifting means being mounted to a respective said guide track such that the planar object can be repositioned on said prongs by lifting of the planar object off of said prongs by raising of said support elements with said second lift means and by then moving said prongs with said third drive means prior to lowering of the planar object back onto said prongs by lowering of said support elements with said second lift means.

2. Machine for handling planar objects as claimed in claim 1;
   wherein said crossmember has a lateral storage side and an opposite lateral transfer side;

wherein said guide tracks are cantilevered away from the transfer side of said crossmember.

3. Machine for handling planar objects as claimed in claim 1;

wherein said two second lift means are respective two hydraulic jacks on which said support elements are mounted.

4. Machine for handling planar objects as claimed in claim 1 wherein said carriage includes:

at least two axles on which said movable carriage is mounted, said axles having respective ends and extending parallel to said prongs; and at least one wheel mounted on each said axle.

5. Machine for handling planar objects as claimed in claim 4;

wherein one wheel is mounted on each said respective end of each said axle.

6. Machine for handling planar objects as claimed in claim 1 wherein said crossmember includes:

C-section tracks joined to that face of said uprights which is nearest the center of said portal; and at least one wheel mounted on each said respective end of said crossmember and traveling in said C-section tracks.

7. Machine for handling planar objects as claimed in claim 1;

wherein each said prong includes a runner traveling in a respective said guide track; and wherein said third drive means is mounted on said crossmember and includes a transmission means for connecting said runners to said third drive means.

* * * * *